May 22, 1962 B. D. NELLIST 3,036,248
ELECTRICAL TIME-OVERCURRENT RELAYS
Filed Dec. 3, 1959 2 Sheets-Sheet 1

Inventor:
Brian David Nellist
By
Stevens, Davis, Miller and Mosher
Attorneys

United States Patent Office 3,036,248
Patented May 22, 1962

3,036,248
ELECTRICAL TIME-OVERCURRENT RELAYS
Brian David Nellist, Manchester, England, assignor to The English Electric Company Limited, London, England, a British company
Filed Dec. 3, 1959, Ser. No. 857,002
Claims priority, application Great Britain Dec. 23, 1958
8 Claims. (Cl. 317—166)

This invention relates to time-overcurrent relays.

According to the invention, a time-overcurrent relay has a rotor biased to a non-operative position by a restoring spring, electrical detector means operative to detect when the rotor has been displaced to an operative position, an electrical winding distributed on a surface of the rotor for energization by a relay operating current, and magnetic stator means having poles positioned to co-operate with current in said winding to turn the rotor against the action of said spring when the current is sufficiently strong, the relay being characterized in that the rotor winding is distributed so that different current carrying paths in it come under the electro-dynamic influence of said poles as the rotor moves from the non-operative position to the operative position but that in any of these positions the same number or effective number of paths are influenced by the poles, whereby the electro-dynamic torque applied to the rotor is substantially independent of the rotor position.

In one embodiment of the invention the rotor has the form of a disc and is mounted on a spindle to turn between the poles of a magnet forming said magnetic stator means, the rotor winding being distributed in a plane over the surface of the disc and comprising a plurality of series connected electrical paths radial from the centre of the disc and equi-angularly spaced, the radial components of the return connections between the paths being on a region of the disc not carried between the magnet poles as the disc moves from its non-operative to its operative position. Preferably the electrical paths forming the rotor winding have a width measured in the plane of the winding and at right angles to their current carrying directions which varies throughout their length to distribute the electrical paths over the plane of the disc and minimize irregularities in the motion of the disc as successive electrical paths pass between poles of the magnet. The rotor winding is conveniently formed by the printed circuit technique.

In another embodiment of the invention, the rotor winding is distributed on the rotor surface so that it compensates for any increase in the restoring force exerted by the spring as the rotor is displaced from its non-operative position, whereby the electro-dynamic force exerted by the magnetic stator means on the rotor winding for a current just strong enough to displace the rotor substantially balances the action of the restoring spring at all rotor positions. Preferably the rotor has the form of a disc and is mounted on a spindle to turn between the poles of a magnet forming said magnetic stator means, the rotor having a winding distributed over the surface of the disc and comprising a plurality of series connected electrical paths radial from the centre of the disc and equi-angularly spaced, the radial lengths of the paths increasing in one direction around the disc and being smaller than the radial width of the poles of said magnet so that the torque producing effect of a current in the rotor winding depends upon the angular position of the rotor, this effect increasing as the rotor is displaced from its non-operative position so as to provide an increased electro-dynamic torque on the rotor which substantially compensates an increase in the spring restoring force with rotor displacement.

In yet another embodiment of the invention, the rotor is composed of an insulating material and said magnetic stator means are energized by the relay operating current, there being on said rotor an electro-conductive element which is positioned to pass between the poles of a damping magnet but so as not to be influenced by said magnetic stator means. This electro-conductive element may comprise a metallic coating around the periphery of a disc rotor which passes between the poles of a damping magnet.

The invention will now be described with reference to the accompanying drawings in which.

The conventional inverse time-overcurrent relay of the induction disc or cup-type is extremely inefficient. The inefficiency arises from the use of an unwound electro-conductive armature and detracts from the sensitivity of the relay. In addition, it is difficult to construct a relay of the induction disc or cup-type which is compact and adequately sensitive, and in which the magnet system does not saturate within the working range. In a relay of simple design this saturation can not be tolerated if the relay is of the kind where the time of operation must be inversely proportional to the square of the operating current. This is because the torque in this type of relay is proportional to the square of the flux, which is only linearly dependent on the current if the core is unsaturated.

The efficiency and therefore the sensitivity of the relay, can be improved and the state of saturation can be kept outside the working range of the relay with a consequent undistorted operating characteristic by using a wound rotor instead of a simple electro-conductive armature, but it is difficult to manufacture a wound rotor which is light as well as robust.

This invention provides a time-overcurrent relay having a wound rotor which retains many of the advantages of the conventional induction type armature relay and is, in some of its embodiments, extremely easy to manufacture.

The invention requires that the rotor winding should be distributed over the rotor surface so that successive parts of it come under the influence of a drive magnet system as the rotor turns whilst the distribution of the winding ensures that once the overcurrent condition arises the relay will operate at a speed directly dependent upon the magnitude of the overcurrent. By this arrangement it is possible to retain some of the advantages of the induction type relay (e.g. the facility for readily adapting the armature for operation in conjunction with a plurality of drive and brake magnet structures) and at the same time provide the sensitivity which is so useful in improving relay performance. One factor arising from the improvement in efficiency of the relay is that it can be made smaller without sacrificing sensitivity.

Figure 1:
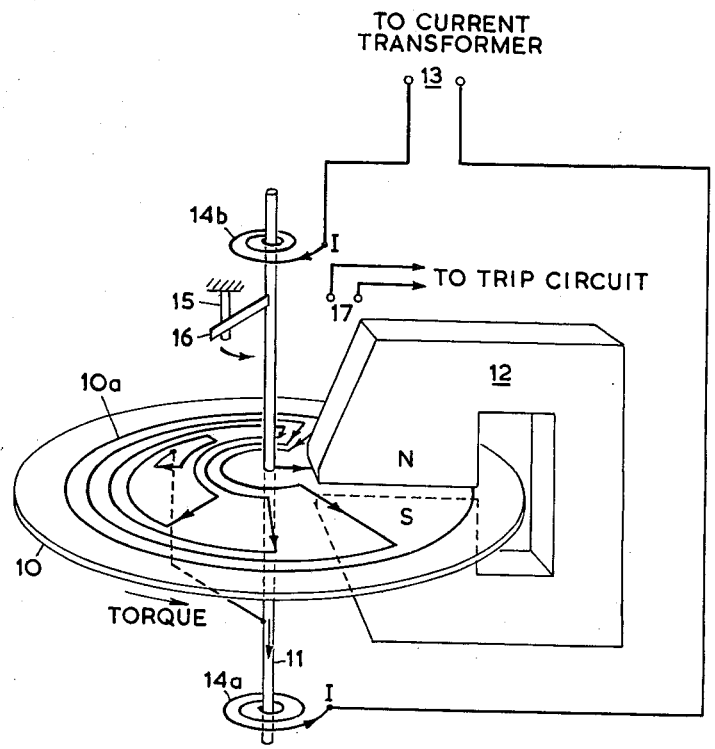
FIG. 1 shows diagrammatically a D.C. operated time-overcurrent relay embodying the invention and having a time-overcurrent characteristic of the form $It$=constant, where I is the overcurrent and $t$ is time.

Referring to FIG. 1 the relay is shown to comprise a disc rotor 10 which is of insulating material and is pivotally mounted by a spindle 11 so that its plane moves between the poles of a permanent magnet 12. An electrical circuit 10a is formed by a winding or its equivalent on the upper face of the rotor 10. This circuit lies substantially in the plane of the disc rotor, and on the parts of it between the poles of the magnet 12 electro-dynamic forces are set up which urge the rotor to rotate in the operating direction. The circuit 10a is energized by a D.C. operating current supplied to the relay terminals 13 and fed to the circuit through flexible connections formed by spiral restoring springs 14a and 14b attached between opposite ends of the spindle and a relay frame structure not shown in the figure. In the absence of an operating current the springs bias the rotor to a non-operative position determined by a stop 15 which arrests an eccentric arm 16 on the spindle 11. When sufficient current flows in the rotor circuit to produce an electro-magnetic force adequate to overcome the bias of the springs the rotor is displaced with a time-delay to the operative position in which the arm 16 bridges the contacts 17 to close a trip circuit. These contacts form the detector which provides the relay output indication.

Figure 2:
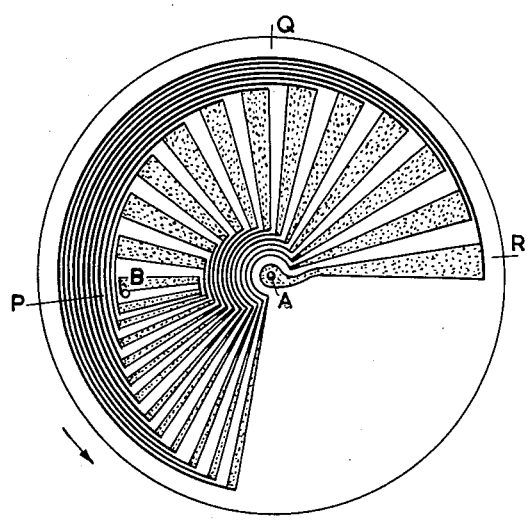
FIG. 2 shows diagrammatically the configuration of a rotor winding formed by an electro-conductive coating on a rotor disc and suitable for incorporation in the relay shown in FIG. 1.

In a preferred embodiment of the invention, the winding on the rotor 10 of FIG. 1 is formed by a printed circuit technique and may have a pattern such as that shown in FIG. 2. The two end connections to the printed circuit are as shown at A and B respectively. The view in FIG. 2 represents the conductive coating on one side of the rotor. The other side of the rotor may be a homogeneous coating of copper and the end connection B of the printed circuit may be connected through the rotor to this under coating of copper which acts, firstly as a return conductor of the printed circuit, and secondly as the eddy current damping medium.

The magnet 12 produces a brake force on the disc by inducing eddy currents in the homogeneous copper coating on its underside. This ensures that the excess of operating torque over the spring restraining torque produces a proportional speed of disc rotation which determines the relay operating time and renders it dependent upon the overcurrent.

To ensure correct operation in this way at low overcurrent values that is for an operating current only slightly greater than that needed to overcome the bias of the restoring springs, it is necessary that the electro-magnetic force on the rotor caused by minimum operating current should be independent of its angular position or, if the spring restoring force increases appreciably with rotor displacement, that the electro-magnetic force should increase with rotor displacement in the operating direction to balance the spring rate.

The rotor winding shown in FIG. 2 meets this requirement. The radial current paths are equi-spaced over the operating sector of the disc and their widths in the plane of the disc and at right angles to their current carrying directions vary to make the fullest use of the area of the disc thereby avoiding any undue discontinuity in the electro-magnetic force as the paths enter and leave the pole gap in the magnet.

As will be seen in FIG. 2 the radial width of the electrical path forming the circuit on the rotor increases around the disc. This feature can be employed in conjunction with a magnet system having the appropriate pole dimensions to operate to compensate for the spring rate of springs 14a and 14b. This is done by making the magnet pole face larger in the radial direction from the pivotal axis of the rotor than the radial lengths of these paths.

In the arrangement shown in FIG. 2 the operative range of movement of the disc carries the region PQR past the pole faces of the magnet. Initially a magnet having a length in the radial direction equal to the largest radial length of the current path through the disc, may be regarded as lying over the connection denoted B. The direction of movement of the disc will in this case be anticlockwise and as the disc rotates greater and greater radial lengths of current path come under the influence of the magnet so that the torque increases with angular displacement to reach a maximum when the disc rotates through an angle of approximately 180 degrees. Over this range this increase in torque can be caused to compensate for an increase in spring rate.

Figure 3:
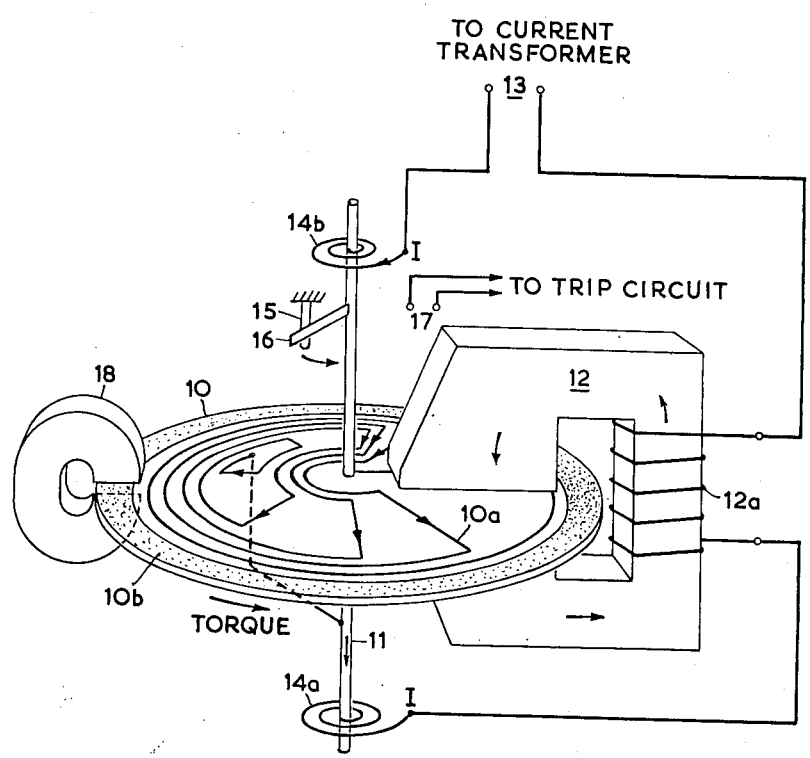
FIG. 3 shows diagrammatically an A.C. operated time-overcurrent relay embodying the invention and having a time-overcurrent characteristic of the form $I^2t$=constant.

In another embodiment of the invention as illustrated in FIG. 3 the magnet 12 of FIG. 1 is replaced by an electro-magnet which is excited in series with the circuit 10a on the rotor. In this arrangement the electro-magnetic drive force on the rotor is proportional to the square of the operating current and the operating characteristic becomes $I^2t=$constant. A brake action is provided in this arrangement by the independent permanent magnet 18 which acts only on a continuous electro-conductive coating 10b on the rotor which is outside the influence of the magnet 12.

It is to be noted that the conductive coating used for brake purposes may take the form of any conductive element. In the arrangement shown in FIG. 1 the element may be the disc itself, the disc being, say, of aluminium and bearing, upon insulation, the printed circuit of the rotor.

In FIG. 3, if the design of the magnetizing system of magnet 12 allows this magnet to saturate over the working range of the relay, the torque set up by the action of a current supplied to the relay terminals 13 will tend to be proportional to the current. It is therefore possible for a relay embodying the invention to be designed to have an operating characteristic which may be expressed as $I^n t=$constant where $n$ lies between 1 and 2 or, alternatively by allowing for the early saturation of the magnet 12, the characteristic of the form $It=$constant may be obtained.

As a result of the increased efficiency, this type of relay has a very low burden at pick-up. It need only be of the order of one-tenth of a watt, and can thus be used in applications where small amounts of operating power are available, such as when the relay is operated from air cored transformers, or capacitance-type voltage transformers or dividers.

What I claim as my invention and desire to secure by Letters Patent is:

1. A time-overcurrent relay having a rotor biased to a non-operative position by a restoring spring, electrical detector means operative to detect when the rotor has been displaced to an operative position, an electrical winding distributed on a surface of the rotor for energization by a relay operating current, and magnetic stator means having poles positioned to co-operate with current in said winding to turn the rotor against the action of said spring when the current is sufficiently strong, the relay being characterized in that the rotor winding is distributed so that different current carrying paths in it come under the electro-dynamic influence of the poles as the rotor moves from the non-operative position to the operative position but that in any of these positions the same number or effective number of paths are influenced by the poles, whereby the electro-dynamic torque applied to the rotor is substantially independent of the rotor position.

2. A time-overcurrent relay according to claim 1, wherein the rotor has the form of a disc and is mounted on a spindle to turn between the poles of a magnet forming said magnetic stator means, the rotor winding being distributed in a plane over the surface of the disc and comprising a plurality of series connected electrical paths radial from the centre of the disc and equi-angularly spaced, the radial components of the return connections between the paths being on a region of the disc not carried between the magnet poles as the disc moves from its non-operative to its operative position.

3. A time-overcurrent relay according to claim 2, wherein the electrical paths forming the rotor winding have a width measured in the plane of the winding and at right angles to their current carrying directions which varies throughout their length to distribute the electrical paths over the plane of the disc and minimize irregularities in the motion of the disc as successive electrical paths pass between poles of the magnet.

4. A time-overcurrent relay according to claim 3, wherein the rotor winding comprises an electro-conductive coating defining a printed circuit.

5. A time-overcurrent relay according to claim 1 wherein said rotor is composed of an insulating material and said magnetic stator means are energized by the relay operating current, there being on said rotor an electro-conductive element which is positioned to pass between the poles of a damping magnet but so as not to be influenced by said magnetic stator means.

6. A time-overcurrent relay according to claim 5, wherein said electro-conductive element comprises a metallic coating around the periphery of a disc rotor which passes between the poles of a damping magnet.

7. A time-overcurrent relay having a rotor biased to a non-operative position by a restoring spring, electrical detector means operative to detect when the rotor has been displaced to an operative position, an electrical winding on the rotor for energization by a relay operating current, and magnetic stator means co-operating with current in said winding to turn the rotor against the action of said spring when the current is sufficiently strong, said winding being distributed on said rotor so that different parts of the winding are subject to the action of said magnetic stator means at different angular positions of the rotor and this distribution of the winding being such as to compensate for any increase in the restoring force exerted by the spring as the rotor is displaced from its non-operative position, whereby the electro-dynamic force exerted by the magnetic stator means on the rotor winding for a current just strong enough to displace the rotor substantially balances the action of the restoring spring at all rotor positions.

8. A time-overcurrent relay according to claim 7, wherein said rotor has the form of a disc and is mounted on a spindle to turn between the poles of a magnet forming said magnetic stator means, the rotor having a winding distributed over the surfaces of the disc and comprising a plurality of series connected electrical paths radial from the centre of the disc and equi-angularly spaced, the radial lengths of the paths increasing in one direction around the disc and being smaller than the radial width of the poles of said magnet so that the torque producing effect of a current in the rotor winding depends upon the angular position of the rotor, this effect increasing as the rotor is displaced from its non-operative position so as to provide an increased electro-dynamic torque on the rotor which substantially compensates an increase in the spring restoring force with rotor displacement.

References Cited in the file of this patent

UNITED STATES PATENTS

| | | |
|---|---|---|
| 2,334,584 | Rich | Nov. 16, 1943 |
| 2,587,568 | Eisler | Feb. 26, 1952 |
| 2,752,539 | Sonnemann | June 26, 1956 |
| 2,773,239 | Parker | Dec. 4, 1956 |